Patented Feb. 2, 1943

2,309,919

UNITED STATES PATENT OFFICE 2,309,919

PROCESS FOR THE PRODUCTION OF CHLORINE

Donald L. Reed, Silver Spring, Md., assignor to Henry A. Wallace, Secretary of Agriculture of the United States of America, and his successors in office No Drawing. Application August 18, 1938, Serial No. 225,568

4 Claims. (Cl. 23—219)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the decomposition and oxidation of hydrogen chloride, nitrosyl chloride and their mixtures to form chlorine, nitrogen peroxide and water and further to give a substantial separation of the gaseous products produced therefrom. This oxidation is produced by the use of nitric acid.

An object of my invention is the production of chlorine and the recovery of fixed nitrogen from the gaseous products resulting from the manufacture of potassium nitrate from potassium chloride and nitric acid.

Another object of my invention is the partial separation of chlorine from the nitrogen peroxide resulting from the reaction of hydrogen chloride and/or nitrosyl chloride and nitric acid.

Still another object of my invention is a simplified technique in the oxidation of nitrosyl chloride and hydrogen chloride.

I have found that the decomposition and oxidation of hydrogen chloride, nitrosyl chloride, or their mixtures, may be accomplished and carried out with nitric acid with greater ease and at lower temperature than was heretofore possible. This is made possible through the use of a catalytic agent hereinafter described. In working my process the catalyst which I employ also enables me to recover the gaseous products partially separated from each other. Thus, a portion of the chlorine is obtained in a substantially pure state while most of the nitrogen peroxide, unreacted material and remaining chlorine are recovered essentially free of water.

As is well-known in the chemical arts, adsorptive forms of silica, such as xerogel aerogel, silica gel, and "glaucosil" (Chem. Abs. Indexes 1926, 1927, 1933, 1937, 1938) have the ability to absorb large quantities of water and to a lesser extent hydrogen chloride, nitric acid, nitrogen peroxide and to some extent, chlorine. It is reversible at any temperature, a decrease in the partial pressure of an adsorbed constituent or an increase in the temperature of the adsorbent causing desorption of the adsorbed material. Furthermore, this adsorptive power is greater toward some materials than with others. I utilize this preferential adsorptive capacity of silica in my invention.

The boiling point of a 68 per cent nitric acid solution is 121° C. at normal atmospheric pressure, yet if the vapors of this solution are passed over adsorbent silica they are retained on the surface of the silica in an adsorbed or condensed phase with properties similar to a liquid phase. Similarly nitrogen peroxide, nitrosyl chloride, water, hydrogen chloride, and to a lesser extent chlorine, are absorbed even at temperatures well above their boiling points.

Many systems have been proposed having as their object the production of chlorine and utilizing the following chemical equations:

1. $NOCl + 2HNO_3 \rightleftharpoons 3NO_2 + \frac{1}{2}Cl_2 + H_2O$
2. $3HCl + HNO_3 \rightleftharpoons NOCl + Cl_2 + 2H_2O$
3. $3HCl + 3HNO_3 \rightleftharpoons 3NO_2 + \frac{3}{2}Cl_2 + 3H_2O$ I use these reactions in a new and novel manner, which allows me to obtain chlorine and nitrogen peroxide with greater ease, purity and efficiency than was heretofore possible by the above equations.

As is well-known, the temperature and moisture content of the system influence to a great extent, reactions 1, 2 and 3. An increase in temperature or a decrease in moisture content tends to cause these reactions to proceed from left to right as they are written. By the use of adsorbent silica, I am able to remove water from the gaseous products of reaction and to so favor the conditions that the reactions will proceed from left to right at relatively low temperatures. Removal of water from the products of reaction also prevents hydrolysis of the products and reversal of the reactions when the products are cooled during their recovery. Adsorbent silica further serves the purpose of retaining hydrogen chloride, nitric acid and nitrosyl chloride in intimate contact in a condensed phase under conditions of temperature and pressure where these materials normally exist only in the gas phase. One may thus carry out the ionic reactions of a solution at a temperature above its normal boiling point. It is also recognized in the chemical arts that at room temperature and above, silica has a distinctly different adsorptive power for chlorine, nitrogen peroxide and water, being least for chlorine, intermediate for nitrogen peroxide and greatest for water. I, therefore, use as my catalytic agent xerogel, aerogel, silica gel, glaucosil, or other form of silica, having (1) the properties of a rigorous drying agent, (2) the ability to strongly adsorb hydrogen chloride, nitric acid and nitrosyl chloride, and (3) the property of selectively adsorbing or desorbing chlorine, nitrogen peroxide, and water.

In carrying out my process for the oxidation of hydrogen chloride and nitrosyl chloride the following procedure is observed. The silica which is to act as a catalytic agent is held in a container in which it may be heated to 350°–400° C. and which may be evacuated during the heating to insure proper activation. This container may also serve as the reaction vessel during the oxidation reaction, in which case the silica alternately acts as a catalytic agent and undergoes reactivation without removal from the container. In carrying out this cycle the mixture of nitric acid and hydrogen chloride or nitrosyl chloride is passed into the activated silica bed at the desired temperature. If the pressure within the system is near atmospheric and the catalyst temperature is between 40° C. and about 160° C., substantially pure chlorine gas will issue from the bed at first. As the flow continues the chlorine will become contaminated with increasing amounts of nitrogen peroxide, and eventually the gases coming from the bed will also contain water, unreacted nitric acid, hydrogen chloride and nitrosyl chloride. When objectionable quantities of these latter gases appear in the mixture, the flow of reactants into the catalyst chamber is stopped and the temperature of the bed is raised to 350°–400° C.

The bed may be evacuated at this time to produce more complete activation. The water and other gases driven from the bed during reactivation may be treated for recovery of nitrogen and chlorine compounds and unreacted materials thus recovered are recycled. Tests have shown that the silica may be reactivated an indefinite number of times and still retain its catalytic properties.

My process may be carried out in a different manner by bringing definite quantities of liquid or gaseous nitric acid and hydrochloric acid or nitrosyl chloride, either gaseous or liquid, into contact with activated silica below the reactivation temperature, in such quantities that the reactants and products are completely absorbed in the bed. The bed temperature is then increased to expel the adsorbed materials. Under these conditions the gas coming from the bed is, first chlorine, which is then followed by a mixture of chlorine and nitrogen peroxide and eventually at higher temperatures by water and unreacted materials. If this latter mode of operation is practiced, a higher catalyst efficiency is obtained by sorbing the reactants at relatively low temperatures, preferably below 40° C. I have also found when carrying out my process that the reactants may be sorbed upon the catalyst separately and individually, or in any combination at the same or different temperatures, the prime essential being that the reactants be simultaneously within the bed at the temperature used to recover the reaction products.

The following examples will serve to illustrate my invention:

*Example 1*

0.0342 mol of liquid nitrosyl chloride evaporated and bubbled through a solution of 69 per cent nitric acid at a temperature of 119° C. formed a gas mixture containing approximately 2 mols of nitric acid per mol of nitrosyl chloride (Equation 1). This gas mixture passed immediately into a bed of activated glaucosil at a temperature of 126° C. The gases leaving the bed were condensed at −78° C. This mixture upon analysis by a standard method showed 0.0127 mol of chlorine, or 74 per cent of the chlorine present in the nitrosyl chloride used.

*Example 2*

2.5931 grams of liquid nitrosyl chloride evaporated and bubbled through 69 per cent nitric acid at a temperature of 119° C. produced a gas mixture containing 2 mols of nitric acid per mol of nitrosyl chloride (Equation 1). This gas mixture passed into a bed of 120 grams of glaucosil at room temperature and was completely absorbed. The temperature of the bed was slowly increased to desorb its contents. When a temperature of 46° C. was attained within the bed, chlorine gas started to issue from the bed. This flow continued until a temperature of 87° C. was reached, when nitrogen peroxide and nitrosyl chloride were found mixed with the chlorine coming from the bed. The chlorine recovered between 46° and 87° C. was substantially pure and amounted to 25 per cent of the chloride content of the nitrosyl chloride used.

It is obvious that these examples do not constitute the sole way of conducting the oxidation of nitrosyl chloride or hydrogen chloride by this process and it is understood that changes in details may be made without departing from the invention or sacrificing the advantage thereof.

Throughout the specification and claims the term "nitrogen peroxide" refers to a mixture of $NO_2$ and $N_2O_4$, and the term "nitric acid" refers to hydrogen nitrate ($HNO_3$) or a solution of $HNO_3$ in water. Similarly, "hydrogen chloride" refers to HCl or a solution of this compound in water.

Having thus described my invention, what I claim for Letters Patent is:

1. A process for the production of chlorine and nitrogen peroxide, which consists in mixing nitric acid with the hydrogen chloride- and nitrosyl chloride-containing gases, derived from treating a material selected from the group consisting of alkali and alkaline earth chlorides, with nitric acid; thence passing this gas mixture through a dried siliceous adsorbent maintained at temperatures ranging from 40° C. to 160° C., whereby a reaction results with a production of chlorine, nitrogen peroxide and water vapor, nitrogen peroxide and water vapor being preferentially adsorbed and retained by the siliceous adsorbent; continuing the passage of the gases through the adsorbent until the chlorine becomes contaminated with undesirable amounts of nitrogen peroxide and water, stopping the flow of the gaseous mixture, and then heating the siliceous adsorbent to at least 400° C. until the remaining gases are driven off and the adsorbent is regenerated.

2. A process for the production of chlorine and nitrogen peroxide, which consists in mixing nitric acid with the hydrogen chloride- and nitrosyl chloride-containing gases, derived from treating a material selected from the group consisting of alkali and alkaline earth chlorides, with nitric acid; thence passing this gas mixture through dried silica gel maintained at temperatures ranging from 40° C. to 160° C., whereby a reaction results with a production of chlorine, nitrogen peroxide and water vapor, nitrogen peroxide and water vapor being preferentially adsorbed and retained by the silica gel; continuing the passage of the gases through the adsorbent until the chlorine becomes contaminated with undesirable amounts of nitrogen peroxide and water, stopping the flow of the gaseous mixture, and then heating the silica gel to at least 400° C. until the remaining gases are driven off and the adsorbent is regenerated.

3. A process for the production of chlorine and nitrogen peroxide, which consists in mixing nitric acid with a gas mixture composed of the group consisting of chlorine, nitrosyl chloride, and hydrogen chloride, thence passing this gas mixture through dried silica gel maintained at temperatures ranging from 40° C. to 160° C., whereby a reaction results with a production of chlorine, nitrogen peroxide and water vapor, nitrogen peroxide and water vapor being preferentially adsorbed and retained by the silica gel; continuing the passage of the gases through the adsorbent until the chlorine becomes contaminated with undesirable amounts of nitrogen peroxide and water, stopping the flow of the gaseous mixture, and then heating the silica gel to at least 400° C. until the remaining gases are driven off and the adsorbent is regenerated.

4. A process for the production of chlorine and nitrogen peroxide, which consists in mixing nitric acid with the hydrogen chloride- and nitrosyl chloride-containing gases, derived from treating a material selected from the group consisting of alkali and alkaline earth chlorides, with nitric acid; thence passing this gas mixture through dried "glaucosil" maintained at temperatures ranging from 40° C. to 160° C., whereby a reaction results with a production of chlorine, nitrogen peroxide and water vapor, nitrogen peroxide and water vapor being preferentially adsorbed and retained by the "glaucosil"; continuing the passage of the gases through the adsorbent until the chlorine becomes contaminated with undesirable amounts of nitrogen peroxide and water, stopping the flow of the gaseous mixture, and then heating the "glaucosil" to at least 400° C. until the remaining gases are driven off and the adsorbent is regenerated.

DONALD L. REED.